Oct. 17, 1961 L. PINET 3,004,543

GREENHOUSE FRAME AND CULTURE APPARATUS INCORPORATING SAID FRAME

Filed Sept. 15, 1959 5 Sheets-Sheet 1

Oct. 17, 1961 L. PINET 3,004,543

GREENHOUSE FRAME AND CULTURE APPARATUS INCORPORATING SAID FRAME

Filed Sept. 15, 1959 5 Sheets-Sheet 2

United States Patent Office 3,004,543

Patented Oct. 17, 1961

3,004,543

GREENHOUSE FRAME AND CULTURE APPARATUS INCORPORATING SAID FRAME

Louis Pinet, Pre Comtal—183, Route de Malintrat, Montferrand, France

Filed Sept. 15, 1959, Ser. No. 840,181
Claims priority, application France Sept. 19, 1958
7 Claims. (Cl. 135—5)

The invention relates to improvements in greenhouse frames comprising one or more rigid frameworks supporting a sheet of transparent plastic material maintained between two sheets of wire mesh or netting having hexagonal meshes, the assembly of the three adjacent sheets being fixed to the framework in a detachable manner.

The advantages of this type of greenhouse frame have been described in the British specification No. 33,271/58.

An object of the invention is to provide improvements more particularly in this type of greenhouse frame so as to render the construction simpler, stronger and capable of mass-production. Another object of the invention is to provide a greenhouse frame having a shape which renders it very stable in the presence of wind, even violent wind, irrespective of the position of the frame so that the various greenhouse frames constituting a culture apparatus can be easily shifted simultaneously to a closed or open position and maintained in these positions.

This greenhouse frame comprises two rectangular panels which are inclined in opposite directions and are in contact at their upper end, the lower ends of the panels being supported in a detachable manner and pivoted to support legs driven into the ground, one of the panels being a semi-fixed panel and supported by a vertical bar whose end supports the upper end of said panel and the other panel being a movable panel and freely resting against the semi-fixed panel.

In this greenhouse frame, each of its two panels comprises a metal framework of light metal tubing consisting of parallel longitudinal members assembled at their ends and at their centres by three cross-members cranked in such manner as to constitute a panel which has a prismatic surface and a polygonal cross-sectional shape which is externally slightly convex, and comprises at least two and preferably three faces, these panels being covered by a sheet of transparent plastic material maintained between two sheets of metal netting maintained on the framework by hooks.

These greenhouse frames are intended to be disposed in continuous parallel rows and supported by T-shaped legs, each leg acting as a support for a movable panel of one row and for a semi-fixed adjacent panel of the neighbouring row, the dihedrons formed by the faces of the panels being such that, bearing in mind the dimensions of the panels and the dimensions of the cross-members of the T-shaped legs, each movable panel when put in its open position rests against the adjacent semi-fixed panel pertaining to the neighbouring row and this contact occurs over the entire area of one of the faces of each of said panels.

Pivoted to the upper end of the movable panel is a pivotable hook comprising two noses which are capable, according to the position of the panel, of hooking either on an element of the other panel of the same greenhouse frame in the closed position, or on an element of the neighbouring panel of the adjacent greenhouse frame in the open position.

Further features and advantages of the invention will be apparent from the ensuing description, with reference to the accompanying drawings to which the invention is in no way limited.

In the illustrated embodiment, the greenhouse frame (FIG. 1) comprises two panels $A_1$ and $A_2$, the panel $A_1$ being the north panel or semi-fixed panel and the panel $A_2$ being the south panel or movable panel. Each of these panels comprises a framework of the general type shown in FIG. 2, each framework comprising two longitudinal members A connected at their ends by cross-members D. These cross-members are cranked as shown in FIG. 3 in the manner described hereinafter. These longitudinal members and cross-members are preferably light metal tubes assembled by welding.

Welded in spaced apart relation on these longitudinal members and the two end cross-members are single hooks L*b* (FIGS. 2 and 6) and on the central cross-member double hooks L*a* (FIG. 5). Held taut on these hooks is a sheet of wire netting E having large meshes (FIGS. 1, 2, 5 and 6) which has previously been provided on its periphery with a large-section metal wire G adapted to render the tension of the netting even. The netting used is an extensible netting having precisely calibrated hexagonal meshes.

Disposed on this netting is a sheet of transparent plastic material F (FIGS. 1, 2, 5 and 6) and over this assembly is held taut a second netting also provided with a wire G on its periphery. In this way, there is obtained an extremely rapid attachment and a high resistance to inclemency of the weather.

Figure 1:
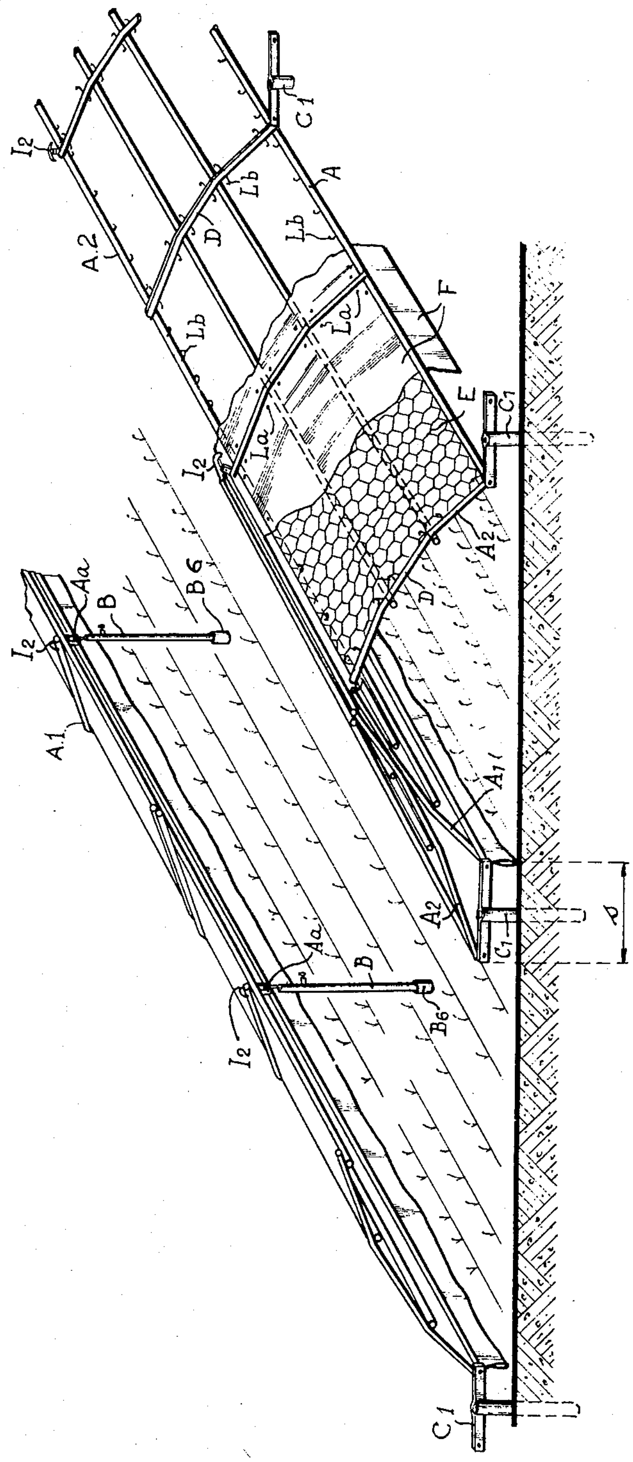
FIG. 1 is a perspective view of two greenhouse frames according to the invention and forming part of the same apparatus, one being in its closed position and the other in its open or insolation position.
Figures 2, 3, 4, 5, 6, 7:
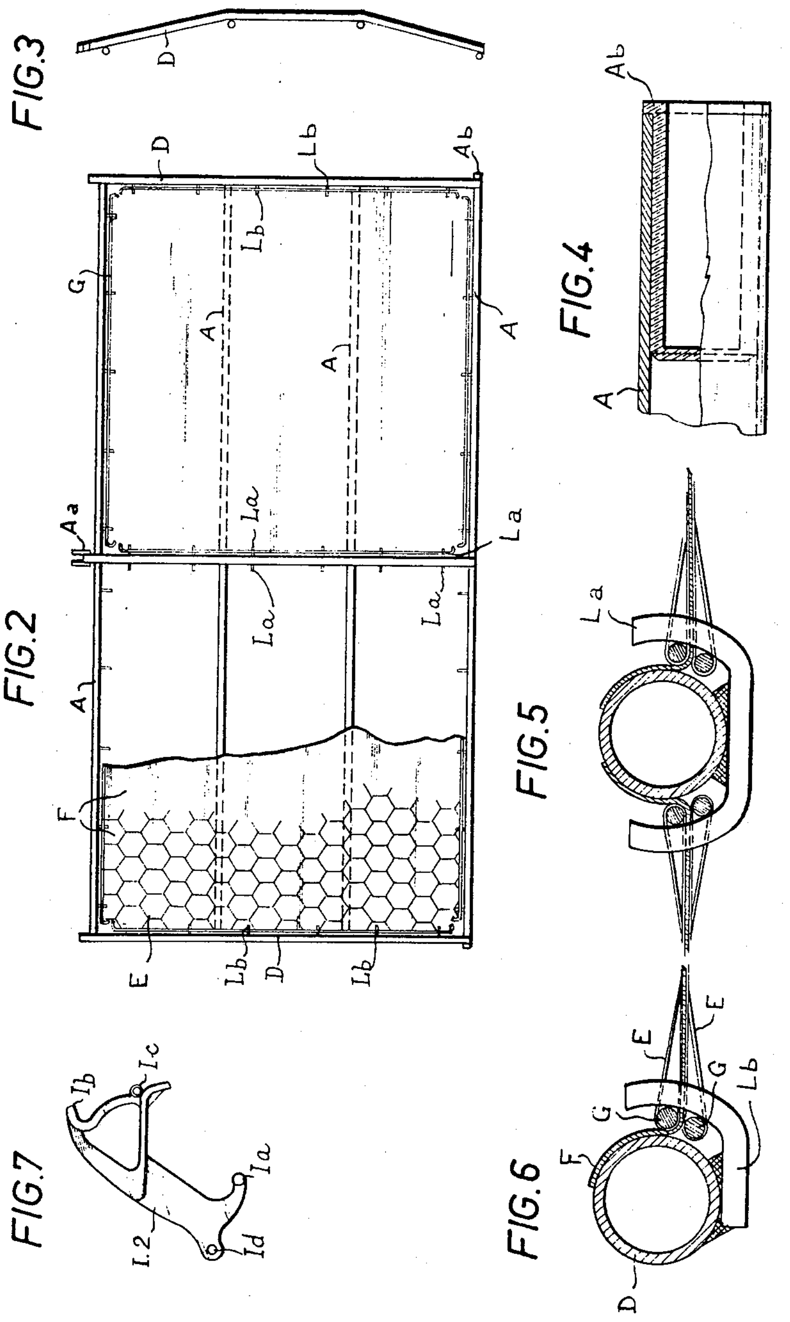
FIG. 2 is a plan view of a panel of the greenhouse frame according to the invention.
FIG. 3 is an end elevational view of the panel shown in FIG. 2.
FIGS. 4 to 6 are views of details.
FIG. 7 is a view of the locking hook.
Figure 8:
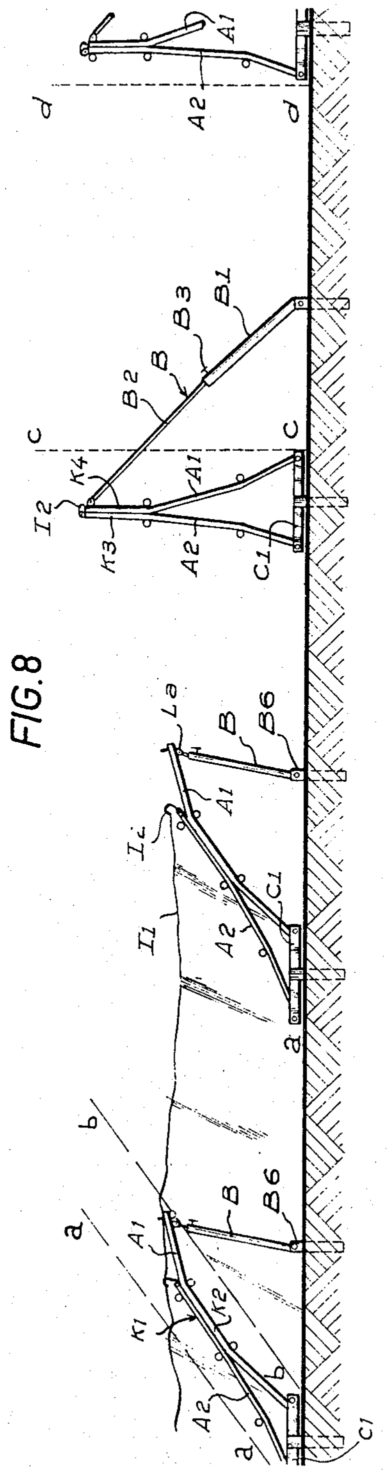
FIGS. 8 and 9 are end views of an apparatus comprising several greenhouse frames in various positions.
Figure 9:
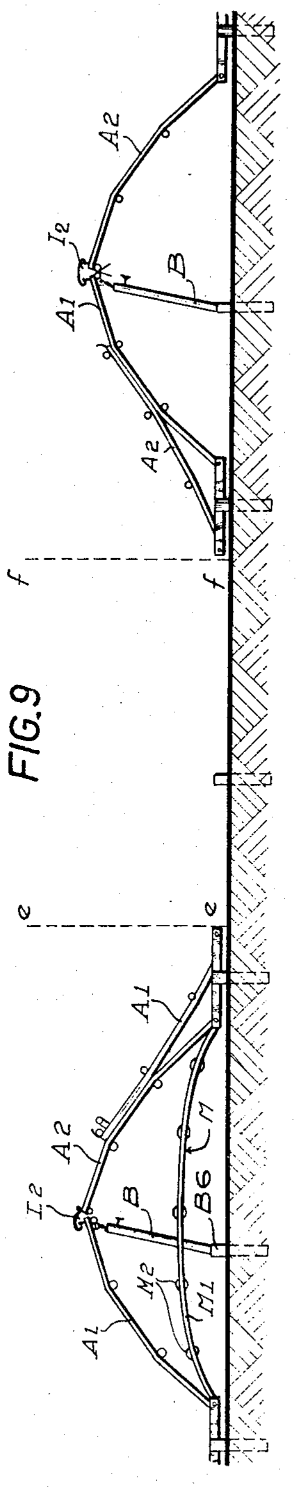
Figure 15:
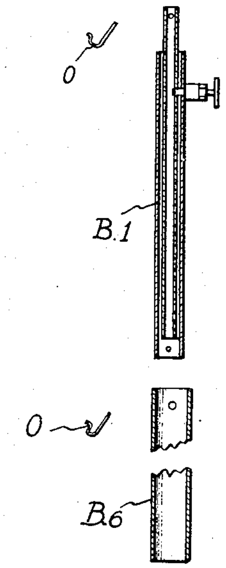
FIG. 15 is a sectional view of a telescopic support bar.
Figure 16:
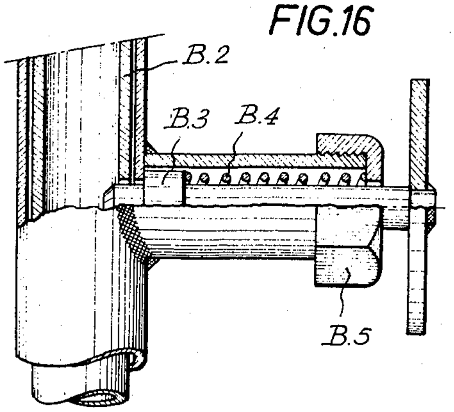
FIG. 16 is a sectional view of locking means for said telescopic bar.
Figure 17:
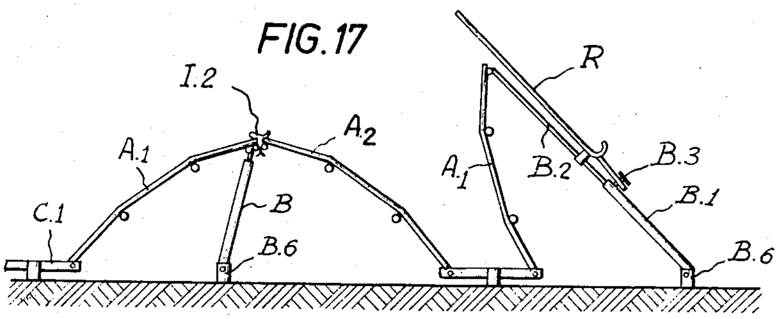
FIGS. 17 and 18 illustrate the opening and closing movements of two adjacent greenhouse frames.

The base tube of each panel comprises at each end (FIGS. 2 and 4) an inner welded sleeve A*b* forming a reinforcement for the pivotal mounting of the panel on a pin carried by a leg $C_1$ (FIGS. 1, 8 and 9). This leg has a T-shape and is fixed in the middle of two rows of identical greenhouse frames, as shown in FIGS. 1 and 8. The two panels of the same greenhouse frame are thus supported by different legs $C_1$. Spaces *s* (FIG. 1) are provided on each side of each of the rows of greenhouse frames and a common leg $C_1$ supports (FIG. 1), on the one hand, a semi-fixed panel $A_1$ of one of the rows and, on the other hand, a movable panel $A_2$ of the adjacent greenhouse frame of the neighbouring row. The semi-fixed panel is supported by a telescopic bar B pivoted at O (FIGS. 1 and 15) to a base $B_6$ pivoted to the greenhouse frame. The telescopic bar comprises (FIGS. 15 and 16) a tube $B_2$ sliding in a tube $B_1$, sliding locking means $B_3$ biased by a spring $B_4$ so as to maintain the bar in its extended position, and an assembly nut $B_5$.

Figure 18:
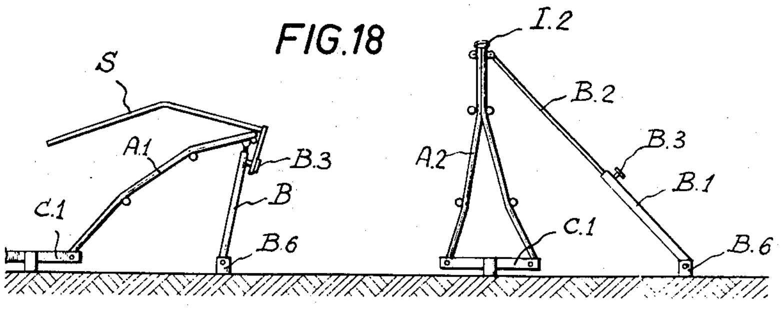

Fixed to the upper edge of the panel $A_1$ is a fork A*a* (FIGS. 2 and 13) on which is pivoted a hook $I_2$ (FIGS. 1, 7, 13 and 14) having two noses I*a*, I*b*, a pivot I*c*, and an eye I*d* for attaching a control connection. This hook is capable of hooking by one of its noses (FIG. 13) in a ring J provided on the upper longitudinal member of the other panel of the same greenhouse frame, or by its other nose on the longitudinal member of the panel of the neighbouring greenhouse frame when two adjacent neighbouring panels pertaining to two adjacent greenhouse frames are raised to a substantially vertical position as shown in the right part of FIG. 18. Connected to this hook is a control cable or chain $I_1$ (FIGS. 8 and 14) which permits simultaneously shifting all the greenhouse frames of a transverse row of the same apparatus. The unhooking of the movable panels and their raising is therefore effected in a single operation.

This greenhouse frame can assume various positions which are more particularly shown in FIGS. 1, 8, 9, 17, 18.

In the open position for airing and insolation in the direction of the penetration lines *aa* and *bb* shown in FIG. 8, which position is very frequently used and illustrated in the left part of FIG. 8, these two panels rest against one another. The polygonal shape of the cross-section of the panels and the angles of the dihedrons formed by the faces of each of them are such that, bearing in mind the length of the cross-members of the T-shape legs $C_1$, a panel $A_2$ (left part of FIG. 8) rests on the panel $A_1$ of the neighbouring greenhouse frame not along a line of contact but over the entire area of the faces $K_1$ and $K_2$ of these panels.

In this way, there is obtained an assembly which in no way catches the wind and which is perfectly stable even in a violent wind. The same is true when the panels are resting against one another through the medium of their end faces $K_3$, $K_4$ (right part of FIG. 8) in the position corresponding to total opening in the vertical direction along lines *cc* and *dd* for sprinkling, manual work and harvesting.

FIG. 9 shows fully closed greenhouse frames (the right and left greenhouse frames). The central greenhouse frame is in its fully open position (lines *ee* and *ff*). The left greenhouse frame is provided with a double winter protection sheet M constituted by a foldable plastic sheet $M_1$ fixed to wooden battens $M_2$.

It will be observed, furthermore, that the telescopic bars can be shifted and controlled by means of a closing lever R (FIG. 17) and an opening lever S (FIG. 18) which permit actuating from outside the greenhouse frame the telescopic locking means, closure being obtained by starting with the North semi-fixed panel and opening by starting with the South movable panel.

Figures 10, 11, 12, 13, 14:
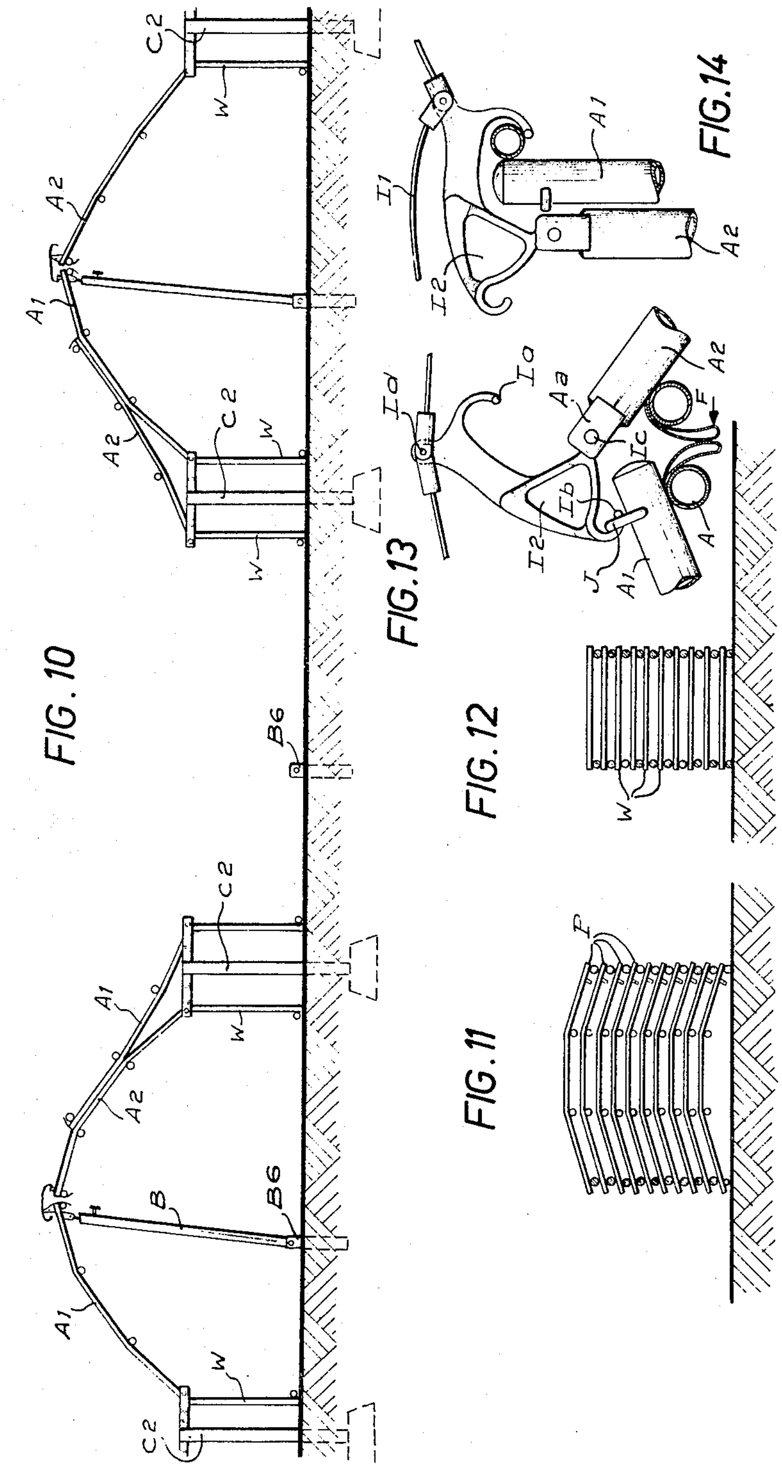
FIG. 10 is a view similar to FIGS. 8 and 9 of another apparatus comprising raised greenhouse frames.
FIGS. 11 and 12 are views of a stack of panels and their supports in position for storage.
FIGS. 13 and 14 are views of the hook shown in FIG. 7 in two positions of use.

Panels $A_1$ and $A_2$ are identical, and are designated in FIG. 11 by the general reference P; the shape of these panels P is such that in their storage position these panels are in contact with one another only along their edges, so as to avoid distortion of these panels.

The legs $C_1$ can be very long such as legs $C_2$ in FIG. 10 so as to create greenhouses permitting the culture of long-stemmed plants. In this case, it is preferable to interconnect the adjacent edges of two panels pivoted to the same cross-member with a band of flexible or rigid material which is preferably transparent and is in the form of a trough or gutter thereby rendering the greenhouses water-tight. The greenhouse frames could also be provided with straight vertical sides or extension walls W (FIG. 10), the storage of which takes up little space (FIG. 12).

Although specific embodiments of the invention have been described, many modifications and changes may be made therein without departing from the scope of the invention as defined in the appended claims.

Having now described my invention what I claim as new and desire to secure by Letters Patent is:

1. Greenhouse frame comprising supports adapted to be embedded in the ground in two parallel lines, and two panels; each panel comprising a light metal tube framework having parallel longitudinal members assembled at their ends and at least at an intermediate point by cross-members cranked in such manner as to constitute a prismatic surface having a polygonal externally slightly convex cross-sectional shape, and at least two faces, two sheets of netting held taut on the framework and held in position by hooks fixed to the framework, a sheet of transparent plastic material held between said two sheets of netting; the lowest of the longitudinal members of each panel being pivoted on one of said lines of supports respectively, and the panels being inclined relative to one another and resting against one another in the manner of the two sloping sides of a roof.

2. Greenhouse frame as claimed in claim 1, wherein the panels have three faces.

3. Greenhouse frame as claimed in claim 2, further comprising a telescopic bar pivoted to a base anchored in the ground, said bar being connected at its upper end to a point of one of the panels so as to support this panel.

4. Greenhouse frame as claimed in claim 3, further comprising a hook having two noses pivoted to the upper edge of one of the panels, one of said noses being adapted to hook on an element fixed to the second panel of said greenhouse frame so as to maintain the two panels assembled in the closed position.

5. An apparatus comprising T-shaped supports placed in the ground in aligned relation so as to constitute longitudinal rows and transverse rows extending in the direction parallel with the cross-members of the T-shaped supports, and greenhouse frames; each greenhouse frame comprising two panels having a light metal tube framework having parallel longitudinal members interconnected at their ends and at least an intermediate point by cross-members cranked in such manner as to constitute a prismatic surface having a polygonal externally slightly convex cross-sectional shape and at least two faces, two sheets of netting held taut on the framework and maintained in position by hooks fixed to the framework, a sheet of transparent plastic material maintained between said two sheets of netting, the lowest longitudinal member of one of the panels of the greenhouse frame being pivoted to the ends of the cross-members of the T-shaped supports of one row and the lowest longitudinal member of the other panel of the greenhouse frame being pivoted to the ends of the cross-members of another longitudinal row of T-shaped supports, and these two panels being inclined relative to one another and resting against one another in the manner of the two sloping sides of a roof; each longitudinal row of T-shaped supports thus supporting two longitudinal rows of panels pertaining to two longitudinal rows of greenhouse frames; and the length of the cross-members of the T-shaped supports, the distance between the rows of the T-shaped supports, and the transverse dimensions of the panels and the dihedral angles of their faces being such that the panels of one of the longitudinal rows are capable, in pivoting about their pivotable connection to the cross-members of the T-shaped supports, of resting against the panels of the greenhouse frames of the neighbouring longitudinal row, this contact occuring over the entire area of one face of said polygonal surfaces.

6. An apparatus as claimed in claim 5, wherein a panel of each greenhouse frame comprises a hook which has two noses and is pivoted to the upper edge of this panel, and said hooks being adapted either for hooking on a fixed element of the second panel of said greenhouse frame in the closed position or for hooking on the neighboring panel pertaining to the adjacent greenhouse frame of the neighbouring longitudinal row and for maintaining these two panels in a position for resting against one another in the substantially vertical open position.

7. Apparatus as claimed in claim 6, wherein said panels of the adjacent rows which rest against one another in the substantially vertical open position rest against one another over the entire area of the end faces of said polygonal surfaces.

References Cited in the file of this patent

UNITED STATES PATENTS 2,920,920 Couse et al. ............ Jan. 12, 1960

FOREIGN PATENTS 73,534 Denmark .............. Dec. 3, 1951

676,983 Great Britain ........... Aug. 6, 1952